July 8, 1969 S. LARACH 3,454,716
LUMINESCENT IMAGE DEVICE AND COMBINATIONS THEREOF
WITH OPTICAL FILTERS
Filed Jan. 16, 1964

INVENTOR.
SIMON LARACH
BY
William A. Zalesak
Attorney

United States Patent Office 3,454,716
Patented July 8, 1969

3,454,716
LUMINESCENT IMAGE DEVICE AND COMBINATIONS THEREOF WITH OPTICAL FILTERS
Simon Larach, Princeton, N.J., assignor to RCA Corporation, a corporation of Delaware
Filed Jan. 16, 1964, Ser. No. 338,191
Int. Cl. H01j 29/89, 29/18; H04n 5/44
U.S. Cl. 178—7.86                             2 Claims

ABSTRACT OF THE DISCLOSURE

A luminescent image device having an improved phosphor screen which is especially suited for viewing under high ambient light conditions, for example, direct bright sunlight. The screen is comprised of a first phosphor having a relatively broad emission band and a relatively low peak emission intensity and a second phosphor which has a relatively narrow emission band and a relatively high peak emission intensity. Images on the screen may be viewed directly in low ambient light or viewed through a suitable optical filter in high ambient light.

---

Figure 1:
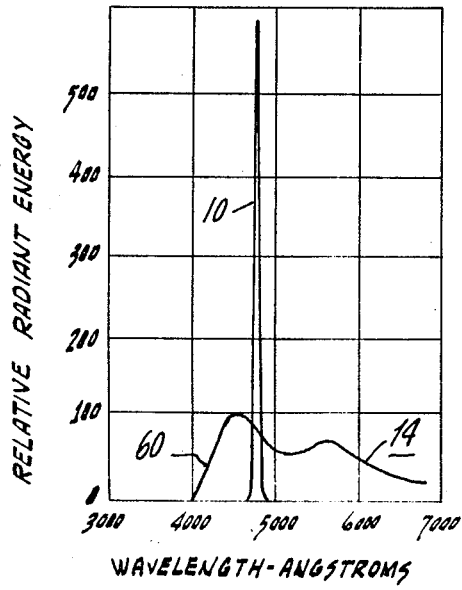

As used herein: (a) the "peak emission" of a phosphor is that maximum light output which, under excitation, occurs at some specific spectral wavelength as compared to the lesser light output which occurs at immediately shorter and longer spectral wavelengths; (b) the peak emission intensity of a phosphor is the amount of light output in an extremely narrow band of wavelengths centered at the wavelengths of the peak emission which is produced by a given intensity of excitation; the total emission intensity of a phosphor is the amount of light output at all wavelengths of the phosphor's emission which is produced by a given intensity of excitation. When the emission intensities of two phosphors are compared with each other, the phosphors are considered to be subjected to equal excitation, and in the same manner at an intensity level within the range of normal, practical operating conditions; (c) the emission band of a phosphor is the spectral range of wavelengths within which the luminescent emission is concentrated, the width of the band being equal to the spectral range at one-half the peak emission; (d) the "transmission band" of a filter is the spectral range of wavelengths within which the transmission of the filter is concentrated, the width of the band being equal to the spectral transmission range at one-half the peak transmission; (e) the matching of a filter transmission band with a phosphor emission band means that the filter transmission band and the phosphor emission band are centered at approximately the same spectral wavelength. The filter transmission band width may be narrower than, substantially equal to, or slightly wider than the width of the phosphor emission band; (f) when one phosphor emission band is described as falling within or outside of another phosphor emission band, it is meant that that portion of the spectral band which defines the one phosphor's band width is within or outside that portion of the other spectral band which defines the other phosphor's width; (g) the term "standard P1" phosphor means the manganese-activated zinc orthosilicate phosphor identified as No. 1021 and standardized by the U.S. National Bureau of Standards; and (h) the term "unaided eye" means without the use of an optical filter but does not exclude the use of optical corrective lenses as may be required for a particular observer.

It is an object of this invention to provide a luminescent image device having an improved phosphor screen which is especially suited for viewing under high ambient light conditions, for example, in direct bright sunlight.

It is also an object of this invention to provide means including a luminescent image device which produces a high quality image both when viewed directly in low ambient light and when viewed through a suitable optical filter in high ambient light.

In accordance with the invention, the phosphor screen of a luminescent image device includes a first phosphor which has a relatively broad emission band and a relatively low peak emission intensity and a second phosphor which has a relatively narrow emission band and a relatively high peak emission intensity. The narrow emission band of the second phosphor lies within the broad emission band of the first phosphor. The total emission intensity of the first phosphor is preferably greater than that of the second phosphor. In high ambient light, the phosphor screen is viewed through optical filter means having a narrow (e.g., less than one hundred angstroms) transmission band approximately matched to the emission band of the narrow band phosphor, to provide an image of good contrast. The filter means is located remote from the phosphor screen between the ambient light and the observer (e.g., as a pair of spectacles worn by the observer). In low ambient light, the phosphor screen is viewed directly without the aid of the filter means to obtain the benefits of the light output of the first phosphor.

For the purpose of brevity and clarity, the invention is hereinafter described by way of example as involving a cathode ray tube having a cathodoluminescent phosphor screen. However, other luminescent image devices may instead be used in the practice of the invention, e.g., panel display devices having electroluminescent phosphor screens, and display means having X-ray and ultra-violet excited phosphor screens.

It has long been known that an absorption type optical filter can be spectrally matched with, and disposed adjacent to, the phosphor screen of a cathode ray tube to improve the image quality when the tube is viewed under high ambient light conditions. Examples of such knowledge appear in U.S. Patent 2,419,177 issued to Albert Steadman on Apr. 15, 1947, and in U.S. Patent 3,013,114 issued to J. E. Bridges on Dec. 12, 1961.

The prior art taught that even in combination with a suitable filter, in order to get a high ratio of image brilliance to background brilliance, the phosphor of a cathode ray tube screen had to have a broad emission band so as to produce an image of high brilliance. Thus, to substitute a narrow band phosphor for the prior art broad band phosphor, even though the narrow band phosphor might have a high peak emission intensity, would be contrary to the teaching of the prior art because decrease of total light output was believed to be unacceptable. This belief may have been prompted, at least in part, by the fact that even where a broad band absorption type faceplate filter was optimumly matched with the conventional broad-band luminescent emission of a cathode ray tube, the improvement in image contrast was marginal. Such marginal improvement resulted because the filter, being broad banded to match the phosphor, failed to attenuate a sufficiently large percentage of the ambient light which fell upon the phosphor screen. Similarly, to substitute a narrow band interference filter for the prior art broad band absorption filter would produce no advantage since this would decrease the observable light of the luminescent image as well as the unwanted ambient light. Furthermore, since narrow band interference filters reflect rather than absorb the non-transmitted light, the use of an interference filter as a prior art substitution would increase the reflection of ambient light from the faceplate-filter combination and thus even further degrade the image contrast.

The degree of improvement provided by the present invention over the prior art can be seen by comparing the effectiveness of ambient light elimination by the present arrangement with that by a typical prior art arrangement in which a broad band absorption filter is matched with a broad band phosphor and positioned adjacent to the phosphor screen. Because the filter in the prior art arrangement is positioned adjacent to the phosphor screen, none of the ambient light directed to the observer is eliminated. On the other hand, because the filter of the present arrangement is positioned at the observer, it eliminates substantially all of such light, only that small portion of such light having wavelengths which lie within the narrow transmission band of the filter not being greatly attenuated.

The ambient light which would, in the absence of any filter, fall on the face of the image device and be reflected to the observer may be divided into two classes, viz, that having wavelengths which lie within the transmission band of the filter and that having wavelengths which fall outside the transmission band of the filter. The first of these two classes of light is not significantly attenuated by either the prior art arrangement or the present arrangement. However, since the filter of the present arrangement has a transmission band, e.g., one-fifth as wide as the filter of the prior art arrangement (e.g., 100 angstroms as opposed to 500 angstroms), there is only one-fifth as much of this unattenuated light which reaches the observer in the present arrangement. Of the second of these two classes of light, substantially all thereof is eliminated by the filter of the present arrangement. On the other hand, because the filter of the prior art arrangement is positioned adjacent to the phosphor screen, a significant portion of this light is reflected from the front face of the filter toward the observer. Such light is the most detrimental of all to image contrast since it increases the apparent luminous level of the image background. Therefore, the present arrangement eliminates many times the ambient light that the prior art arrangement eliminates and provides a contrast ratio which is many times that provided by the prior art arrangement.

Figure 2:
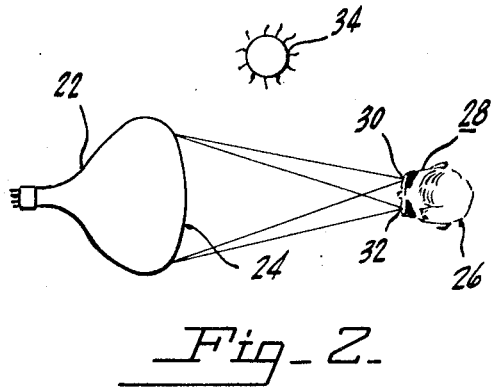
Figure 3:
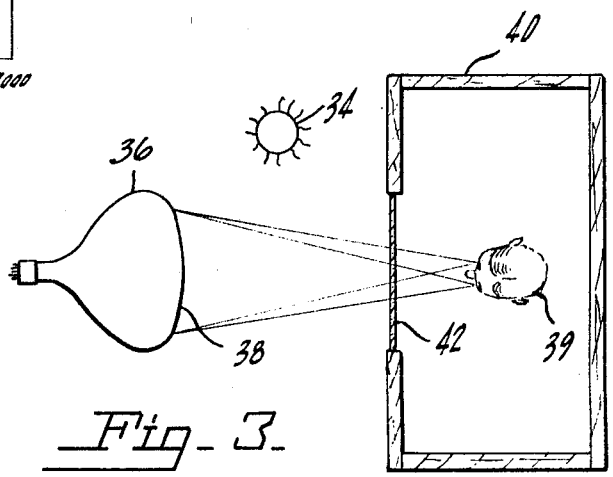
Figure 4:
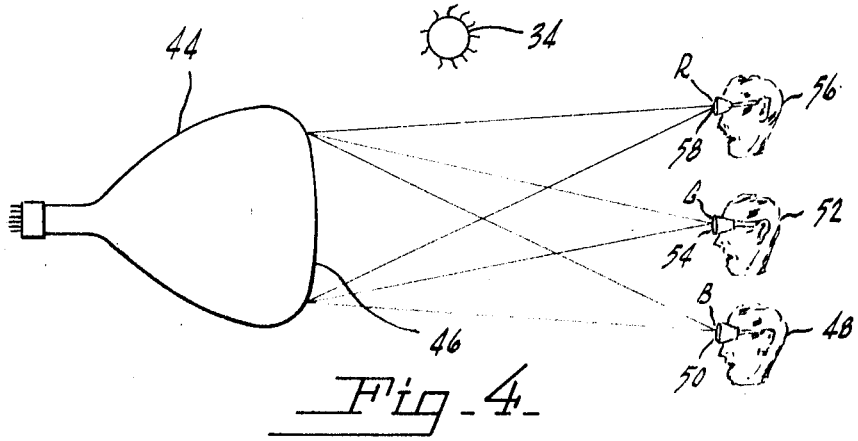

In the drawings:

FIG. 1 is a graph illustrating the spectral energy emission characteristics of a high-peak, narrow-band phosphor suitable for use in this invention and comparing it with the spectral energy emission characteristics of conventional broadband phosphors; and FIGS. 2, 3, and 4 are schematic views of different embodiments of the invention.

Phosphors suitable for use in the practice of this invention preferably have a relatively high peak emission intensity. Theoretically, the absolute value of the peak emission necessary to provide a satisfactory image presentation depends upon the brilliance of the ambient or background light. If the ambient or background light is of low brilliance, then the peak emission intensity of the phosphor can be correspondingly low and still produce a satisfactory image. Even in bright sunlight ambient, a favorable positioning of the display screen facing away from direct radiation of the sun lessens the phosphor peak emission intensity requirements. In order to provide satisfactory operation in high ambient light, e.g., in bright sunlight, it is preferred that peak emission intensity of the phosphor be greater than the solar radiant power density at the spectral wavelength of the phosphor's peak emission. (See, e.g., FIG. 25–1 of IES Lighting Handbook, Illuminating Engineering Society, New York, N.Y.) Under the most adverse ambient light conditions where gray-scale image production is desired, the phosphor peak emission intensity is preferably at least twice the solar radiant power density, or, as compared with standard phosphors, about six or more times the peak emission intensity of the standard P1 phosphor. Also theoretically, the emission band of the phosphor need not be limited to some maximum allowable width. If the emission band is greater than the width of the transmission band of the filter used in combination with the phosphor, the filter will block out the phosphor luminescence which does not fall within the transmission band of the filter. Some of the emitted energy is then wasted. However, in order that a phosphor exhibit the desired peak emission intensity, it ordinarily must also have a relatively narrow emission band into which the total luminescent energy is concentrated, usually less than about 100 angstroms. This situation exists because of a theoretical limit of maximum energy conversion efficiency of phosphors in general and because of the factors which dictate the practical limits of the amount of energy which can be applied to excite the phosphor.

Phosphors having the desired characteristics as set forth above generally contain rare-earth activators, viz, those elements of the Periodic Table numbered 58 (cerium) through 71 (lutetium). The preferred phosphors are those having a host crystal of a zinc and/or cadmium chalcogenide. Such preferred phosphors are hereinafter described in detail in the appendix which follows.

In FIG. 1, the curve 10 depicts the response characteristic of a cathodoluminescent, thulium-activated zinc sulfide phosphor (ZnS:Tm), which at 20° C. has an emission band width of approximately 75 angstroms and which peaks at approximately 4,773 angstroms. This phosphor is described in detail as Example 5 in the appendix. Considering the visible spectrum to be about 3,800 angstroms wide (3,800–7,600 angstroms), this narrow band phosphor has an emission band width which is less than one-fiftieth of the visible spectrum.

The curve 10 of the ZnS:Tm phosphor, is shown superimposed on the response characteristic curve 14 of a conventional P4 sulfide phosphor screen comprising silver activated zinc sulfide and silver activated zinc-cadmium sulfide such as that described in the booklet "RCA Phosphors" published by Radio Corporation of America in 1961. Such a superimposition illustrates that the rare-earth activated phosphor has a peak emission whtich is approximately six times the peak emission of the P4 phosphor screen. On the other hand, because of the very narrow band width of the rare-earth activated phosphor, its total luminescence is substantially less than the total luminescence of the P4 phosphor screen. Nevertheless, when used in one of the arrangements hereinafter described, this phosphor produces high contrast images in bright sunlight.

Optical filters suitable for use in the practice of the invention should have a relatively narrow transmission band, e.g., less than one-fortieth as wide as the visible spectrum. Interference type filters are especially desirable because these have narrow band transmission characteristics. Typical filters of the interference type, having a transmission band of 100 angstroms or less, are commercially available from several filter manufacturers. The characteristics of such filters are described, for example, in "Principles of Optics," by Max Barn and Emil Wolf, Pergamon Press Inc., New York, N.Y., 1959.

Cathode ray tubes having different forms of screens which include high-peak narrow-band emission phosphors and combinations thereof with different forms of narrow-band optical-filter means are described in the following examples.

EXAMPLE A

FIG. 2 illustrates a luminescent image device, e.g., a cathode ray tube 22, which includes a phosphor screen 24. To present a monochrome image, the phosphor material of the screen 24 may, for example, comprise blue-emitting ZnS:Tm as described in Example 5 of the appendix and whose response characteristic curve 10 is illustrated in FIG. 1. An observer 26 is provided with a pair of spectacles 28. The lenses 30 and 32 of the spectacles 28 comprise narrow band optical filters. Each of the filter lenses 30 and 32 has a narrow, e.g., 100 angstrom wide, transmission band which is centered at the wave length of the peak emission of the phosphor screen 24. An ambient light source 34, such as the sun or an incandesent light bulb, illuminates the space surrounding the image device 22. The filter lenses 30 and 32, being positioned between the observer 26 and the ambient light, serve to block from the observer 26 all of the ambient light except that which falls within the very narrow transmission band of the filter lenses 30 and 32. This includes not only that light which is reflected from the face of the image device 22, but also that light which is directed from the source 34 toward the observer's eye. As a result of such elimination, the observer 26 views a readily discernible, high-contrast image on the screen 24, notwithstanding the lower brilliance of the image due to the narrow emission band properties of the phosphor screen 24.

Where use in bright sunlight is anticipated, the spectacles 28 may, if desired, be such that the narrow band optical filter means matched to the phosphor emission band is provided as only a part of each lens 30, 32, e.g., in a manner similar to a bifocal lens. The remainder of each lens is provided as a more conventional neutral grey or green absorption type filter sun glass lens.

EXAMPLE B

FIG. 3 illustrates another luminescent image device, e.g., a cathode ray tube 36, which includes a phosphor screen 38. To present a monochrome image, the phosphor of the screen 38 may, for example, comprise the blue-emitting ZnS:Tm of Example A. An observer 39 is located in an enclosure 40 having a window 42 therein through which he may observe the phosphor screen 38. The window 42 comprises a narrow band optical filter having a transmission band of, e.g., 100 angstroms which is centered at the wavelength of the peak emission of the phosphor screen 38. Since the observer 39 is separated from the ambient light source 34 by the enclosure 40, all of the ambient light except that light which falls within the transmission band of the filter window 42 is blocked from the observer 39.

EXAMPLE C

In accordance with another arrangement the phosphor screen 24 (FIG. 2) includes a blue-emitting, narrow band phosphor and a yellow-emitting, broad band phosphor. The blue-emitting phosphor may be ZnS:TmLi (Example 7 of the appendix) having an emission band of approximately 70 angstroms. The yellow-emitting phosphor may be a (Zn:Cd)S:Ag material having a zinc sulfide to cadmium sulfide ratio of about 45/55 and a silver content of about 0.005 weight percent and having an emission band width of about 1300 angstroms. The emission band of the narrow band ZnS:TmLi phosphor lies outside of, and is spaced from, the emission band of the broad band (Zn:Cd)S:Ag phosphor. The blue-emitting ZnS:TmLi and the yellow-emitting (Zn:Cd)S:Ag are mixed in a weight ratio of 3/1.

Under relatively low ambient light conditions the observer 26 views the screen without the use of the filter and sees a black and white image. Under relatively high ambient light conditions, the observer 26 wears the spectacles 28, whose lenses have a narrow, e.g., not substantially greater than 100 angstroms, transmission band matched to the emission band of the ZnS:TmLi phosphor and sees a blue monochrome image of greatly improved visibility and contrast over that observable without the spectacles 28.

As a variation to this example, a similar arrangement may be used with the FIG. 3 apparatus wherein the filter window 42 is provided with the proper narrow transmission band.

EXAMPLE D

In the arrangement of FIG. 2, the tube 22 may comprise a color cathode ray tube, such as one having a phosphor screen 24 composed of three different color emitting phosphors which are adapted to be selectively excited to produce a color image. The tube 22 may, for example, comprise: a mosaic dot screen shadow mask type tube such as the commercially available RCA 21FBP22; a mosaic line-screen feedback tube such as that described in U.S. Patent 2,932,756, issued to Arthur Liebscher on Apr. 12, 1960; or a three layer screen penetration type tube such as that described in U.S. Patent 2,455,710 issued to C. S. Szegho on Dec. 7, 1948. The three phosphors of the color screen 24 may comprise the narrow band blue-emitting ZnS:Tm phosphor (Example 5 of the appendix) and conventional or modified broad-band red-emitting and green-emitting silver activated zinc-cadmium sulfide phosphors (e.g., P22 phosphors in "RCA Phosphors" booklet supra). Each of the filter lenses 30 and 32 worn by the observer 26 are made to have a single narrow transmission band matched to the emission band of the blue-emitting ZnS:Tm phosphor. Under high ambient light conditions the observer 26 views a blue monochrome image through the filter lenses; under low ambient light conditions the observer 26 removes the filter lenses and views a full-color image.

In a variation of this example, the filter means may be provided as illustrated in FIG. 3. The filter window 42 is made to have a single narrow transmission band matched to the blue-emitting ZnS:Tm phosphor.

EXAMPLE E

In certain applications of cathode ray tubes, a plurality of different images are simultaneously displayed on a single screen and a corresponding plurality of observers view the screen to visually select a single image. Such applications, for example, may involve a traffic control system wherein three different kinds of information, for example: (a) aircraft on the runways of an airport; (b) aircraft in a holding pattern aloft adjacent to the airport; and (c) aircraft approaching the airport from afar, are imaged on a single phosphor screen. Each of three different men are assigned the job of observing and processing a different one of these images. However, because of the superimposition of the images—notwithstanding the fact that they are in different colors, e.g., green, yellow, and blue—discrimination by one observer of the information for which he is responsible is often confusing and difficult.

FIG. 4 illustrates an arrangement wherein a plurality of images on a single screen may be observed by a plurality of observers, each of whom sees only that information for which he is responsible. In FIG. 4, an image display device, e.g., a cathode ray tube 44 includes a phosphor screen 46 which is composed of three different narrow-band emission phosphors, each of which can be separately excited with a different information presentation. For example, the tube 44 may comprise either a shadow mask tube or a line screen feedback type tube as hereinbefore referred to. The three phosphors of the screen 46, may, for example, comprise green-emitting erbium-activated zinc sulfide (ZnS:Er), yellow-emitting dysprosium-activated zinc sulfide (ZnS:Dy) and blue-emitting thulium-activated zinc sulfide (ZnS:Tm) which are described, respectively, in Examples 1, 2, and 5 of the appendix.

A first observer 48 is provided with a pair of spectacles 50 having optical filter lenses each of which is made to have a transmission band matched to the emission band of the green-emitting ZnS:Er. A second observer 52 is provided with a pair of spectacles 54 having optical filter lenses each of which is made to have a transmission band matched to the emission band of the yellow-emitting ZnS:Dy. A third observer 56 is provided with a pair of spectacles 58 having optical filter lenses each of which is made to have a transmission band matched to the emission band of the blue-emitting ZnS:Tm. Thus, each of the observers 48, 52, and 56 sees only that image which is displayed in a color which his filter spectacles are designed to transmit. Discrimination between that image and the images of the other two colors is substantially complete. This arrangement may find its greater use under conditions of low ambient light where the spectacles serve to facilitate discrimination between the different color images. If desired, one or more of the observers may have filter spectacles that permit him to view two of the different colored images, e.g., by having different filters in the lenses 30 and 32.

EXAMPLE F

In an application wherein a cathode ray tube is to be viewed not only under high ambient light conditions, but also at times under low ambient light conditions, it may be desirable to retain the high light output capability of a broad band phosphor and also obtain the high contrast advantages of the high-peak, narrow-band phosphors. To achieve this end, a cathode ray tube may be provided which has a phosphor screen possessing the combined energy response characteristics of both a broad band phosphor and a narrow band phosphor.

The broad band phosphor has a higher total emission intensity than does the narrow band phosphor. The narrow band phosphor, on the other hand, has a higher peak emission intensity than that of the broad band phosphor, preferably four or more times higher. The emission band of the narrow band phosphor is also preferably not greater than about one-tenth as wide as, and lies within, the emission band of the broad band phosphor.

For example, in a monochrome system according to FIG. 2, the phosphor screen 24 may comprise narrow-band blue-emitting ZnS:Tm (Example 5 of the appendix) and broad band blue-emitting ZnS:Ag such as that which constitutes one of the components of a conventional P4 phosphor mix (e.g., see "RCA Phosphors" booklet, supra). The response characteristics of these two phosphors are respectively illustrated in FIG. 1 by curve 10 and by the left hand portion 60 of curve 14. In such example, the broad band phosphor has an emission band of about 750 angstroms (4,300–5,050 angstroms) peaking at about 4,550 angstroms. The narrow band phosphor has an emission band of about 75 angstroms (4,735–4,810 angstroms) peaking at about 4,773 angstroms.

The observer 26 is provided with filter lenses 30 and 32, each of which has a narrow transmission band matched to the emission band of the narrow band phosphor ZnS:Tm. Under conditions of high ambient light, the observer 26 views the image presented on the phosphor screen 24 through the filter lenses 30 and 32; under low ambient light conditions, the viewer 26 may remove the filter lenses 30 and 32 and view the image on the screen 24 directly. In either case a blue monochrome image is presented.

The narrow band phosphor should peak at a wavelength within the band width of the broad band phosphor. In order that the color of the viewed image both with and without use of the filter be substantially the same, it may be preferred that the narrow band phosphor peak at a wavelength near the wavelength at which the broad band phosphor peaks.

The relative proportions of the two phosphors, ZnS:Tm and ZnS:Ag, which are mixed to provide the screen 24 are dependent upon the particular conditions under which the tube is to be used. If high image contrast under high ambient light conditions is the primary feature desired, then the percentage of the narrow band ZnS:Tm phosphor is increased. On the other hand, if considerable use is to be made of the tube under low ambient light conditions without filter spectacles, then a higher percentage of the broad band ZnS:Ag phosphor is used.

As a variation of this example the filter arrangement of Example B may be used instead of the spectacles.

EXAMPLE G

An arrangement involving a mixture of broad band and narrow band phosphors can also be used to present a black and white image under low ambient light conditions and a monochrome image under high ambient light conditions. The phosphor screen 24 (FIG. 2) may be made of a mixture of phosphors including narrow band blue-emitting ZnS:Tm (Example 5 of appendix) and broad band blue-emitting ZnS:Ag and yellow-emitting (Zn:Cd)S:Ag. The broad band phosphors may be the same as the components of a conventional P4 mix (see "RCA Phosphors" booklet supra), or modifications thereof, but in slightly different proportions such that with the addition of the narrow band ZnS:Tm the screen produces a substantially white light. With such a screen, filter means as disclosed in either Example A or Example B may be used.

Under high ambient light conditions, the observer 26 uses the filter lens spectacles in viewing the screen 24 and sees a blue monochrome image; under low ambient light conditions he dispenses with the filter lenses and sees a black and white image having the higher brilliance advantages which the additional light from the broad-band P4 constituent of the phosphor screen provides.

As in a monochrome type screen, the emission band of the narrow band phosphor should lie within the emission band of the broad band phosphor of corresponding color.

APPENDIX

Some suitable narrow band phosphors may be made by a process which comprises reacting a zinc, or cadmium, or zinc-cadmium chalcogenide with 0.001 to 5.0 mol percent of at least one rare earth element, as a halide thereof in an oxygen-free ambient, and then cooling the reaction product. By excluding oxygen from the ambient during the reaction and by introducing the rare earth element as a halide thereof, this process produces phosphors which exhibits substantial luminescence emission in relatively narrow spectral bands.

This process applies to phosphors in which the host material is a zinc, or a cadmium, or zinc-cadmium chalcogenide. Chalcogenides, as used herein, are sulfides, selenides, tellurides, and mixtures thereof. The preferred compositions for the host material are those which produce single phase solid solutions conveniently, although compositions which produce more than one phase may also be used. The range in composition for the host material may be represented approximately by the molar formula:

$$aM^1S:bM^2Se:cM^3Te$$

where:

$M^1$, $M^2$, and $M^3$ are each at least one member of the group consisting of zinc and cadmium
$a = 0.0$ to $1.0$ mol
$b = 0.0$ to $1.0$ mol
$c = 0.0$ to $1.0$ mol, and
$a+b+c = 1.00$ The preferred host material is zinc sulfide. The alternative host materials are those in which cadmium is substituted for part or all of the zinc, and/or selenium and/or tellurium is substituted for part or all of the sulfur in the preferred zinc sulfide host material.

At least one rare earth activator is included in the host material in proportions of 0.001 to 5.0 mol percent of the host material. A single rare earth element is preferred as the activator. Combinations of two or more rare earth elements may be used. The rare earth elements are selected from the rare earth group of the Periodic Table. The group consists of elements numbered 58 (cerium) to 71 (lutetium). The preferred rare earth elements are determined by the application in which the phosphor is to be used. Because of the nature of the processes described herein, the rare earth element is usually trivalent when it is incorporated in the host material. This is the desired valency for the activator.

Auxiliary activators may be included with the rare earth activator. The particular auxiliary activator which is selected depends upon the use for the phosphor. In the case of electroluminescent phosphors, it is desirable to include 0.01 to 1.0 mol percent of copper, as an oxygen-free compound thereof, in the host material.

The phosphors of this process are generally prepared in two steps: (1) preparing a batch of the constituents, and then (2) reacting the batch to produce the phosphor. The first step is designed to provide a uniform and intimate mixture of the constituents of the phosphor. The mixture of constituents should be as free of oxygen and oxygen-containing compounds as possible. The constituents may be introduced in various alternative ways. Sulfur, selenium, tellurium, zinc, and cadmium may be introduced in elemental form or as oxygen-free compounds thereof. It is preferred that the constituents of the host material be prepared first by intimately mixing, as by ball milling chalcogenides of zinc and cadmium as required, and then calcining the mixture at about 700 to 1400° C. in an oxygen-free atmosphere, preferably hydrogen sulfide. The calcined host material mixture may be mixed or ground again and recalcined if necessary. The rare earth activators and auxiliary activators, as halides thereof, are then intimately mixed with the prepared batch of host material. The activators may be introduced as any halide: fluoride, chloride, bromide, and iodide. The batch with the activators therein may also be calcined in an oxygen-free atmosphere to remove any volatile matter and to commence the reaction.

If the phosphor is to contain copper, several alternative methods may be used for introducing the copper activator. In one method, the host material is slurried with a soluble copper halide and then the slurry is thoroughly dried. After drying, the rear earth halide is added mechanically by any of the above described processes. In a second method, a compound copper-rare earth sulfide is first prepared in the desired proportion of copper and rare earth. The compound is then mixed with the host material, and the mixture calcined in the temperature range of 800 to 1200° C. in a hydrogen sulfide atmosphere. The mixture is then reground.

One or more fluxes may be included in the batch. A suitable flux is a material which melts; that is, forms a liquid phase, at temperatures below 800° C. A flux is introduced to lower the reaction temperature, to accelerate the reaction, and/or to produce a more uniform product. The preferred fluxes are alkali halides, such as sodium chloride, sodium bromide, potassium iodide, lithium chloride, and rubidium chloride.

The second step is designed to react the host material and activators to form the phosphor without introducing oxygen. To this end, the mixture of host material and activators is heated in a non-oxidizing oxygen-free ambient at temperatures between 700 and 1400° C. for 0.1 to 10 hours. In the preferred process, the batch is heated in a hydrogen sulfide atmosphere for 3 to 8 hours at 900 to 1300° C. The optimum heat treatment; that is, the combination of heating time and heating temperature, for a particular batch is determined empirically and is dependent in part on the composition of the reaction product. The degree of heat treatment is generally lower as the content of cadmium, selentium, and tellurium is increased at the expense of zinc and sulfur. A neutral atmosphere or a vacuum may be used instead of a hydrogen sulfide atmosphere in both the calcining and reacting steps. Some suitable gas atmospheres are: argon, neon, nitrogen, ammonia, and mixtures thereof. After the heating is completed, the reaction product is cooled to room temperature and is ready for use as a phosphor. To improve homogeneity, the reaction product may be ground and refired one or more times. If a flux has been used, any excess flux may be removed by leaching.

When excited by 3660 angstrom ultraviolet light, most phosphors described in the examples below luminesce both at room temperature and at liquid nitrogen temperature (77° K.). The emission is principally in narrow bands, many of which appear to be associated with the characteristic 4f—4f transitions of the particular rare earth activator incorporated in the host material. In addition to these narrow bands, there is, in many samples a broad band, either separate or lying beneath the narrow bands and dominated by the narrow bands.

Phosphor Examples 8–11 are electroluminescent and are thus especially suited for electric field excitation.

Example 1

Mix zinc sulfide with 1.0 mol percent $ErCl_3$. Calcine the mixture as described above. Then, heat the calcined mixture at about 1150° C. for about 1 hour in a hydrogen sulfide atmosphere free of oxygen, and then cool the reaction product to room temperature. The product is a phosphor having the approximate molar composition ZnS:0.01 $Er^{3+}$ which exhibits a luminescent emission peaked at about 5350 angstroms.

Example 2

Mix zinc sulfide with 0.1 mol percent $DyF_3$ and calcine the mixture as described above. Heat the calcined mixture at about 1150° C. for about 1 hour in a hydrogen sulfide atmosphere which is free of oxygen, and then cool the reaction product. The product is a phosphor having the molar composition ZnS:0.001 $Dy^{3+}$ and exhibits a luminescence which peaks at about 5750 angstroms.

Example 3

Mix and calcine ZnS with 0.1 mol percent $TbF_3$ as in Example 2. Then heat the calcined mixture for about 3 hours at about 1150° C. in an oxygen-free hydrogen sulfide atmosphere. The product is a phosphor having the molar composition ZnS:0.001 $Tb^{3+}$ and exhibits a luminescence which peaks at about 5500 angstroms.

Example 4

Mix and calcine ZnS with 0.1 mol percent $HoF_3$ as in Example 2. Then heat the calcined mixture for about 3 hours at about 1150° C. in an oxygen-free hydrogen sulfide atmosphere. The product is a phosphor having the molar composition ZnS:0.001 $Ho^{3+}$ and exhibits a luminescence which peaks at about 4975 angstroms.

Example 5

Mix zinc sulfide with 0.1 mol percent $TmF_3$ and then calcine the mixture as described above. Heat the calcined mixture at about 1150° C. for about 1 hour in a hydrogen sulfide atmosphere free of oxygen, and then cool the reaction product. The reaction product is a phosphor having the approximate molar composition ZnS:0.001 $Tm^{3+}$ and which has a luminescent emission band centered at about 4773 angstroms with a band width of about 50 angstroms. Sharp components of this band may be more or less noticeable. No color shift has been observed with changes in excitation level.

Example 6

Mix zinc sulfide with 0.4 weight percent $TmF_3$ and 20 weight percent NaCl as described above. Heat the calcined mixture at about 1050° C. for about 1 hour in an atmosphere of hydrogen sulfide which is free of oxygen, and then cool the reaction product to room temperature. This phosphor has the approximate molar composition ZnS:0.004 $Tm^{3+}$ and an emission band centered at about 4755 angstroms with a band width of about 50 angstroms. Sharp components of this band may be more or less noticeable. No color shift has been observed with changes in excitation level.

Example 7

Mix zinc sulfide with 0.01 mol percent of thulium chloride and 0.01 mol percent of lithium chloride and calcine at 120° C. Heat the calcined mixture in a hydrogen sulfide atmosphere for one-half hour at 800° C. and then for one-half hour at 1200° C. The resultant product is a phosphor having an emission band which peaks at about 4773 angstroms and which is about 70 angstroms wide.

Example 8

Mix 100 grams of pure zinc sulfide with 0.1 gram copper as cuprous chloride and 0.1 gram erbium, as the chloride, and then calcine the mixture as described above. Heat the calcined mixture at about 1150° C. for about 3 hours in an atmosphere of hydrogen sulfide which is free of oxygen, and then cool the reaction product to room temperature. The reaction product has the approximate molar composition ZnS:0.001 $Cu^{1+}$:0.001 $Er^{3+}$ and exhibits a luminescent emission about 5250 angstroms under excitation with a 10,000 cycle electric field.

Example 9

Mix 100 grams pure ZnS with 0.1 gram copper as cuprous chloride and 0.1 gram erbium, as the fluoride, and then calcine the mixture. Mix the calcined mixture with 20 weight percent NaCl. Heat the resultant mixture at about 1000° C. for about 1 hour in an atmosphere of hydrogen sulfide which is free of oxygen, and then cool the reaction product to room temperature. The reaction product has the approximate molar composition ZnS:0.001 $Cu^{1+}$:0.001 $Er^{3+}$ and exhibits a luminescent emission in narrow bands peak at about 5300 angstroms when excited with a 10,000 cycle electric field.

Example 10

Mix and calcine ZnS with 0.1 mol percent $TbF_3$ and 0.1 mol percent CuCl as in Example 10. Then heat the calcined mixture for about 3 hours at about 1150° C. in an oxygen-free hydrogen sulfide atmosphere. The product is a phosphor having the approximate molar composition ZnS:0.001 $Cu^{1+}$:0.001$Tb^{3+}$ and exhibits an electroluminescence which peaks at about 5500 angstroms.

Example 11

Mix and calcine ZnS with 0.1 mol percent $HoF_3$ and 0.1 mol percent CuCl as in Example 10. Then heat the calcined mixture for about 3 hours at about 1150° C. in an oxygen-free hydrogen sulfide atmosphere. The product is a phosphor having the approximate molar composition ZnS:0.001 $Cu^{1+}$:0.001$Ho^{3+}$ and exhibits an electroluminescence which peaks at about 4975 angstroms.

What is claimed is:

1. The combination of:
    (a) an image device comprising a phosphor screen and means for exciting said screen to luminescence, said screen including a first phosphor and a second phosphor, said second phosphor having an emission band which is narrower than that of said first phosphor and which falls within the emission band of said first phosphor and having a peak intensity which is greater than the peak intensity of said first phosphor, and
    (b) optical filter means through which an observer may view said screen, said filter means being disposed between said observer and the ambient light, said filter means having a narrow transmission band not greater than about 100 A. substantially matched to the emission band of said second phosphor.

2. The combination of:
    (a) an image device comprising a phosphor screen and means for exciting said screen to luminescence, said screen including a first phosphor having an emission band whose width is not less than 750 angstroms, and a second phosphor having an emission band whose width is not greater than 75 angstroms and which lies within the emission band of said first phosphor, the peak emission intensity of said second phosphor being at least four times as great as the peak emission intensity of said first phosphor and the total emission intensity of said first phosphor being greater than that of said second phosphor; and
    (b) spectacle means adapted to be worn by an observer and through which said observer may view said screen, said spectacle means comprising an optical filter lens having a transmission band whose width is not greater than 100 angstroms and which is substantially centered with respect to the emission band of the second phosphor.

References Cited

UNITED STATES PATENTS

| | | | |
|---|---|---|---|
| 2,644,854 | 7/1953 | Sziklai | 178—7.86 |
| 2,958,002 | 10/1960 | Cusano | 313—92 |
| 3,250,722 | 5/1960 | Borchardt | 252—301.4 |
| 3,271,512 | 9/1966 | Daw | 178—5.4 |

RALPH D. BLAKESLEE, *Primary Examiner.*

J. A. ORSINO, JR., *Assistant Examiner.*

U.S. Cl. X.R.

178—5.4; 313—92